No. 660,534. Patented Oct. 23, 1900.
C. P. STEINMETZ.
REGULATING DYNAMO ELECTRIC MACHINES.
(Application filed Aug. 18, 1899.)
(No Model.)

Witnesses.
Edward Williams, Jr.
Benjamin B. Hull.

Inventor.
Charles P. Steinmetz,
by Albert G. Davis
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

REGULATING DYNAMO-ELECTRIC MACHINES.

SPECIFICATION forming part of Letters Patent No. 660,534, dated October 23, 1900.

Application filed August 18, 1899. Serial No. 727,662. (No model.)

*To all whom it may concern:*

Be it known that I, CHARLES P. STEINMETZ, a citizen of the United States, residing at Schenectady, county of Schenectady, State of New York, have invented certain new and useful Improvements in Regulating Dynamo-Electric Machines, (Case No. 1,074,) of which the following is a specification.

My present invention relates to the regulation of dynamo-electric machines, and more especially to those of the alternating-current type. The regulation of the machine or machines is performed indirectly by regulating the exciter, the regulation of the latter being effected by passing alternating current from the mains of the machine to be regulated through the armature of the exciter, thereby producing in the exciter an armature reaction having a component acting to vary the field of the exciter and as a consequence the field of the machine to be regulated. In some of its features my invention is similar to that disclosed in a patent to E. W. Rice, Jr., No. 595,412, dated December 14, 1897, but comprises certain distinct improvements and differences in construction and operation not found in said patent.

The features and points of novelty which constitute my invention will be particularly pointed out in the appended claims, while its nature and mode of operation will be set forth in detail in the following description and accompanying drawings, in which—

Figure 1:
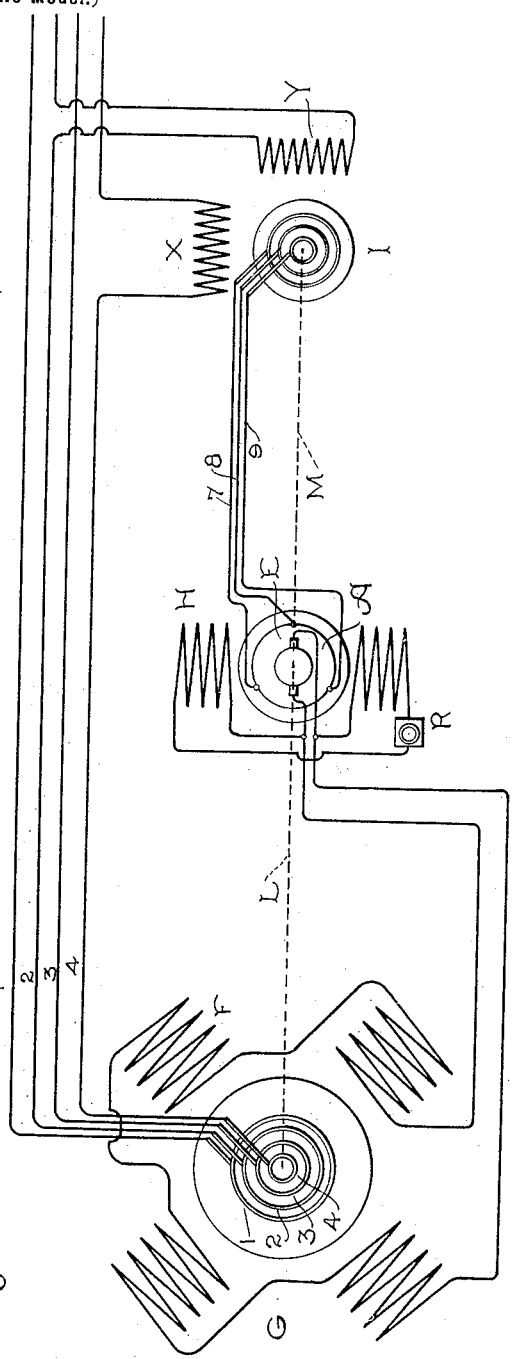
Figure 2:
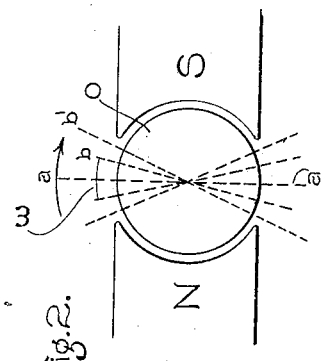

Figure 1 represents one embodiment of my invention in diagram, and Fig. 2 is an explanatory diagram.

The machine to be regulated may be of any type so long as it is of such a nature that alternating currents may be derived from its armature or from mains in connection therewith of a frequency directly proportional to its rate of rotation. The invention is thus applicable to rotary converters, motor-generators, alternating-current machines, either motors or generators of any number of phases, or any other machines possessing the qualification described.

For purposes of illustration I have shown in the drawings a quarter-phase generator G, having suitable collector-rings to which the alternating mains 1 2 3 4 are connected in the ordinary manner, as shown. As is commonly the case, the field-winding F of the machine is supplied with current from a separate direct-current exciter. (Shown at E.) This exciter, except as to certain details hereinafter to be described, does not differ radically from exciters ordinarily employed for the purpose mentioned. As shown, the exciter is provided with an armature A, having a commutator and brushes bearing thereon in the usual manner. Current is supplied from the brushes of the machine to excite the field-winding H, and a rheostat R is employed for controlling the excitation of the latter.

So far as thus described the apparatus is identical with many installations now in use. It differs therefrom, however, in the means employed for varying the field of the exciter in response to variations of load and power factor in the alternating lines. To secure the results desired, the armature of the exciter is driven synchronously with respect to the armature of the machine to be regulated, and for this purpose it may conveniently be mounted upon the shaft or a continuation of the shaft of the main machine. In the drawings I have designated this connection by means of a dotted line L, which line is intended to indicate the axis common to the armatures of the exciter and main machine.

In order to vary the field of the exciter, multiphase alternating currents derived from the alternating mains are passed through the armature-winding of the exciter and produce therein an armature reaction acting to strengthen or weaken the field of the exciter in response to variations in magnitude or power factor of the currents supplied. It is necessary that the armature reaction due to the alternating current supplied to the exciter-armature shall be fixed in position with respect to the field. To secure this result, the number of poles of the exciter and of the machine to be regulated have heretofore been made equal, since the machines were supplied with the same frequency current and run at the same speed. It is, however, inconvenient, expensive, and undesirable to have a large number of poles in the exciter, which is ordinarily a machine of small capacity. According to my invention I am enabled to make the exciter of as few a number of poles as desired by supplying the same with current of suitably-reduced frequency, the frequency chosen being such as will cause the rotating polarity in the exciter-armature due to the currents supplied to be fixed in space, and therefore fixed with respect to the field of the exciter.

In order to obtain currents of suitable frequency for supplying the exciter, I make use of an induction-machine I, in this instance directly connected to the same shaft as the exciter, the connection being symbolized by the dotted line M. The induction-machine I or frequency-changer is provided with a primary winding of common construction, corresponding to the number of phases of current which it is to utilize. In the present case the primary winding consists of two coils or sets of coils X Y in quarter-phase relation to each other, the coils being connected in series with corresponding mains of the two-phase system of conductors 1 2 3 4 in a manner readily understood.

The current flowing in the alternating mains is passed directly through the windings of the inducing member of the frequency-changer I, thereby setting up electromotive forces in the windings of the induced member directly proportional to the amount of current flowing in the primary windings and of a frequency dependent on the relative rate of rotation of the induced member with respect to the inducing member. It will of course be understood that the electromotive forces set up in the winding of the induced member may be given any value desired by choosing a suitable ratio of transformation for the inducing and induced windings of the frequency-changer. The resulting currents are conveyed through suitable conductors and passed through the armature of the exciter in such manner as to set up a rotary magnetic field therein. To accomplish this result, any symmetrical multiphase connection of conductors may be employed. In this instance I find it most convenient to transmit three-phase currents from the induced member I of the frequency-changer to the armature A of the exciter, and for this purpose suitable transmitting-conductors 7 8 9 are employed, the conductors being connected in three-phase relation with the respective windings of the frequency-changer and exciter. It is to be understood that the operation of my invention is not dependent upon the particular multiphase current transmitted from the frequency-changer to the exciter. The use of three-phase currents is, however, in this case convenient, because it permits the use of the smallest number of conductors, and thus reduces the complication of connections required.

The relation between the number of poles of the several machines is determined by the fact that the exciter must be furnished with alternating current of such frequency as would drive it as a motor at the same speed at which it is driven by reason of its mechanical connection with the generator or other machine to be regulated. The number of poles of the exciter must therefore correspond with the frequency of slip in the frequency-changer. Assuming the same rate of rotation for all the machines, a generator of ten poles, for example, with an exciter of two poles, would therefore require a frequency-changer or induction-machine of eight poles. For each revolution of the armature of the machines the frequency-changer would produce one cycle of current, which would be consumed by the exciter during the same revolution. If, however, the armatures of the exciter and frequency-changer revolve at different rates, the relation of poles is other than that described and must be chosen to fit the special case, as will be readily understood. For purposes of illustration in the drawings the generator G is shown as having four poles; but it will be understood that in practice the number of poles is ordinarily much larger. In this instance the exciter and frequency-changer have half the number of poles of the generator or other machine to be regulated and are therefore bipolar. With the arrangement shown in the drawings the flux in the primary or inducing member of the frequency-changer revolves with twice the speed of rotation of its induced member, which, as described, rotates with the same speed as the armature of the machine to be regulated. The current set up in the induced member is therefore of one-half frequency. This current is supplied to the armature A of the exciter E, and the connections are so made as to cause the polar line resulting therefrom to rotate in a direction opposite to the rotation of the shaft. The rates of rotation being thus equal and opposite in direction, the polar line therefore remains fixed in space.

As heretofore stated, one of the features of the present invention consists in regulating dynamo-electric machines. This regulation is effected by compensating for the effects of armature reaction due to lagging or leading currents flowing in the armature of the machine to be regulated and for the counter electromotive force of self-induction. As is well known, the effect of lagging current in a generator, for instance, is to cause a demagnetization of the field, while, on the other hand, leading current causes the field to strengthen. By "lagging" or "leading" current is here meant a current which lags or leads with respect to the induced electromotive force of the machine as distinguished from a current which lags or leads with respect to the electromotive force at the terminals of the machine. The self-induction of the machine causes the electromotive force at the terminals to lag behind the induced electromotive force, so that when the current supplied by the machine is in phase with its terminal electromotive force it is lagging with respect to its induced electromotive force. To overcome the drop in voltage due to the self-induction of the armature, it is therefore necessary that there should be a slight magnetizing action of the exciter when the machine to be regulated is working at unit power factor. To secure this result, the angular relation of the armatures of the main machine and exciter is made such as to cause the polar line produced in the exciter-armature by the alternating currents to be slightly in advance of a position at right angles to the exciter-field when the current in the alternating circuit is in phase with its electromotive force—in other words, when the alternator is working at unit power factor. Fig. 2 will make this relation a little clearer. N and S indicate the poles of the exciter, and O the armature-winding. The dotted line $a$ represents the neutral line or position midway between the poles of the exciter, while the dotted line $b$, slightly in advance of $a$, shows the position assumed by the polar line in the armature due to the alternating currents when the alternator is working at unit power-factor. The resulting magnetomotive force produced by the current in the armature-conductors between the double angle of lead $w$ being directly in line with that produced by the field is therefore added thereto, thereby increasing the current supplied by the exciter and so compensating for the drop in voltage due to the current, which, although in phase with its terminal voltage, lags with respect to its induced electromotive force. If the power factor of the alternating system were to change and the current commence to lag, the polar line $b$ would be shifted forward in the direction of rotation indicated by the arrow, since, as will readily be seen, the instant corresponding to maximum current would not occur until a time later than would be the case if the power factor were unity. The new position of the polar line is illustrated at $b'$. The component of armature reaction in line with the field magnetism of the exciter is therefore increased, thereby causing a resulting increase in the field-flux of the generator necessary to overcome the effects of lagging current. With leading current the reverse operation takes place. It is of course to be understood that the connections are to be so made as to cause the effects of lagging current to increase the current of the exciter and leading current to decrease the same if the machine to be regulated is a generator. If the machine to be regulated is a motor, its armature reaction being the reverse of that of a generator must be regulated to correspond.

It is obvious that my invention may assume many modifications and that its features of novelty may be embodied in apparatus of many different forms. For this reason, therefore, I do not wish to be limited to the particular relation of parts shown, but wish my claims to be construed as broadly as the state of the art will allow.

What I claim as new, and desire to secure by Letters Patent of the United States, is—

1. The combination of an alternating-current dynamo-electric machine, and means for regulating said machine by alternating current derived from circuits of said machine but of a frequency different from that of the current flowing in said circuits.

2. The combination of an alternating-current dynamo-electric machine, an exciter therefor, and means for controlling the voltage of the exciter by current derived from circuits of said machine but of a frequency different from that of current flowing in said circuits.

3. A dynamo-electric machine having an exciter, and a frequency-changer arranged to rotate synchronously therewith.

4. The combination of a dynamo-electric machine, an exciter therefor, and means for passing through the exciter-armature an alternating current of a frequency different from that flowing in the leads of said dynamo-electric machine.

5. The combination of a dynamo-electric machine, an exciter therefor, and means for passing through the exciter-armature an alternating current of a frequency and number of phases different from that flowing in the leads of said dynamo-electric machine.

6. An alternating-current dynamo-electric machine, a synchronously-driven exciter, and means for passing through the exciter alternating current of a frequency different from that flowing in the circuit of said dynamo-electric machine.

7. An alternating-current dynamo-electric machine, a synchronously-driven exciter, and means for passing through the exciter alternating current of a phase and frequency different from that flowing in the circuit of said dynamo-electric machine.

8. An alternating-current dynamo-electric machine, a synchronously-driven exciter, and means for passing through the exciter alternating current of a number of phases different from that flowing in the circuit of said dynamo-electric machine.

9. The combination of an alternating-current dynamo-electric machine, an exciter therefor, means for changing the frequency of current derived from the mains of said dynamo-electric machine, and means for regulating the exciter by the current of changed frequency.

10. The combination of a dynamo-electric machine, an exciter therefor and a frequency-changer having the same number of poles as the exciter.

11. The combination with an alternating-current dynamo-electric machine having a given number of poles, of a synchronously-driven exciter having a different number of poles, and means for conveying alternating current between said machine and the armature of said exciter.

12. The combination with an alternating-current dynamo-electric machine having a given number of poles, of a synchronously-driven exciter having a smaller number of poles, and means for conveying alternating current between said machine and the armature of said exciter.

13. The combination of a dynamo-electric machine, a frequency-changer and an exciter having a number of poles equal to the difference between the number of poles of the generator and of the frequency-changer.

14. The combination of a dynamo-electric machine, an exciter therefor, and means for passing through a winding on the exciter an alternating current of a frequency different from that flowing in said machine.

15. The combination of a dynamo-electric machine, an exciter therefor, and a frequency-changer, all driven at speeds bearing a definite relation to each other.

16. The combination of a dynamo-electric machine, an exciter therefor and a frequency-changer, and means for driving the rotating members of said machines at the same speed.

17. The combination of a multiphase-alternating-current dynamo-electric machine, an exciter therefor, a frequency-changer for producing current of a different frequency and a different number of phases from that flowing in said machine, and means controlled by said current for varying the voltage of the exciter.

18. The combination of an alternating-current dynamo-electric machine, an exciter therefor and means for regulating the exciter by alternating current having a different number of phases from that flowing in said machine.

In witness whereof I have hereunto set my hand this 16th day of August, 1899.

CHARLES P. STEINMETZ.

Witnesses:
 BENJAMIN B. HULL,
 MABEL E. JACOBSON.